(12) United States Patent
Derhardt

(10) Patent No.: US 11,015,648 B2
(45) Date of Patent: May 25, 2021

(54) ADJUSTING SLEEVE FOR A BEARING DEVICE, BEARING DEVICE HAVING AN ADJUSTING SLEEVE, AND METHOD FOR MOUNTING AN ADJUSTING SLEEVE

(71) Applicant: Robert Bosch GmbH, Stuttgart (DE)

(72) Inventor: Steffen Derhardt, Leonberg (DE)

(73) Assignee: Robert Bosch GmbH, Stuttgart (DE)

(*) Notice: Subject to any disclaimer, the term of this patent is extended or adjusted under 35 U.S.C. 154(b) by 285 days.

(21) Appl. No.: 16/322,681

(22) PCT Filed: Jul. 14, 2017

(86) PCT No.: PCT/EP2017/067885
§ 371 (c)(1),
(2) Date: Feb. 1, 2019

(87) PCT Pub. No.: WO2018/024468
PCT Pub. Date: Feb. 8, 2018

(65) Prior Publication Data
US 2020/0378439 A1 Dec. 3, 2020

(30) Foreign Application Priority Data
Aug. 5, 2016 (DE) ...................... 10 2016 214 505.3

(51) Int. Cl.
*F16C 25/04* (2006.01)
*F16C 33/12* (2006.01)
*F16C 35/02* (2006.01)

(52) U.S. Cl.
CPC ............ *F16C 25/04* (2013.01); *F16C 33/122* (2013.01); *F16C 35/02* (2013.01)

(58) Field of Classification Search
CPC ........ F16C 17/22; F16C 17/243; F16C 23/02; F16C 23/04; F16C 25/02; F16C 25/04;
(Continued)

(56) References Cited

U.S. PATENT DOCUMENTS 3,318,642 A * 5/1967 Peterson ................. F16C 23/04
384/215
3,529,873 A * 9/1970 Spieth ..................... F16C 25/02
384/264
(Continued)

FOREIGN PATENT DOCUMENTS

CN 1724851 A 1/2006
CN 1774580 A 5/2006
(Continued)

OTHER PUBLICATIONS

International Search Report for Application No. PCT/EP2017/067885 dated Sep. 6, 2017 (English Translation, 2 pages).
(Continued)

*Primary Examiner* — James Pilkington
(74) *Attorney, Agent, or Firm* — Michael Best & Friedrich LLP

(57) ABSTRACT

The approach which is proposed here relates to an adjusting sleeve (105) for a bearing device (100) having at least one housing (110) for receiving a bearing sleeve (115), the bearing sleeve (115) for receiving a shaft (120), and the shaft (120). The adjusting sleeve (105) is configured to be capable of being received between the bearing sleeve (115) and the housing (110) and to be thermally conductive. To this end, an outer wall (125) of the adjusting sleeve (105) has at least one outer depression (135) which is configured to produce an outer chamber (140) between the adjusting sleeve (105) and the housing (110) in a received state of the adjusting sleeve (105) in the bearing device (100), and/or an inner wall (130) of the adjusting sleeve (105) has at least one inner depression (145) which is configured to produce an inner chamber (150) between the adjusting sleeve (105) and the bearing sleeve (115) in the received state of the adjusting sleeve (105) in the bearing device (100).

18 Claims, 12 Drawing Sheets

(58) Field of Classification Search
CPC ........ F16C 27/02; F16C 33/02; F16C 33/122; F16C 35/02; F16C 37/00; F16C 37/002; F16C 43/02
See application file for complete search history.

(56) References Cited

U.S. PATENT DOCUMENTS

| | | | |
|---|---|---|---|
| 5,044,789 | A | 9/1991 | Damon et al. |
| 2002/0039461 | A1 | 4/2002 | Obara et al. |
| 2007/0047858 | A1 | 3/2007 | Hurley et al. |

FOREIGN PATENT DOCUMENTS

| | | | |
|---|---|---|---|
| CN | 201496408 | U | 6/2010 |
| CN | 101871491 | A | 10/2010 |
| CN | 203384283 | U | 1/2014 |
| CN | 104968896 | A | 10/2015 |
| DE | 915401 | C | 7/1954 |
| DE | 2502323 | A1 | 7/1975 |
| DE | 3836956 | A1 | 5/1990 |
| DE | 3831868 | A1 | 6/1990 |
| DE | 10307842 | A1 | 9/2003 |
| DE | 102004019917 | A1 | 11/2005 |
| DE | 102004035388 | | 3/2006 |
| DE | 102007016171 | | 10/2008 |
| DE | 102011083198 | A1 | 3/2013 |
| GB | 752513 | A | 7/1956 |
| JP | 2000346068 | A | 12/2000 |
| JP | 2002061645 | A | 2/2002 |
| JP | 2009118625 | A | 5/2009 |
| JP | 2011052715 | A | 3/2011 |
| JP | 4976174 | B2 | 7/2012 |
| JP | 2015527544 | A | 9/2015 |
| WO | 9709539 | A1 | 3/1997 |
| WO | 2006007822 | A1 | 1/2006 |

OTHER PUBLICATIONS

D09-Schafer, R. (2013). Tolerance poles internet as a connection element; Machinery. [Url: http://www.maschinenmarkt.vogel.de/toleranzhuelsen-als-Verbindungselement-a-411239/] Posted on Aug. 9, 2017.

* cited by examiner

ADJUSTING SLEEVE FOR A BEARING DEVICE, BEARING DEVICE HAVING AN ADJUSTING SLEEVE, AND METHOD FOR MOUNTING AN ADJUSTING SLEEVE

BACKGROUND OF THE INVENTION

The invention relates to an adjusting sleeve for a bearing device, the bearing device having a housing for receiving a bearing sleeve, the bearing sleeve for receiving a shaft, and the shaft, wherein the adjusting sleeve is designed to be capable of being received between the bearing sleeve and the housing and to be thermally conductive. The invention also relates to a method for mounting an adjusting sleeve, and to a computer program designed to carry out the method.

There are dynamic and static fluid bearings. Both types of bearing comprise at least one shaft and one bearing sleeve, wherein the latter is accommodated in a housing. Particularly in the case of aerodynamic bearings with high-speed shafts running at over 100,000 rpm, there is significant friction power in the bearings, as a result of which the shaft, bearing sleeve and housing heat up. In order to compensate for nonuniform thermal expansions between the components, there would be a need for a compensating and damping element which is thermally conductive to ensure that the bearing gap between the shaft and the bearing changes only slightly or not at all.

SUMMARY OF THE INVENTION

Given this background situation, the approach presented here presents an adjusting sleeve for a bearing device, a bearing device having an adjusting sleeve, a method for mounting an adjusting sleeve, and furthermore a control device which uses this method, as well as, finally, a corresponding computer program in accordance with the main claims. By means of the measures presented in the dependent claims, advantageous developments and improvements of the adjusting sleeve specified in the independent claim are possible.

An adjusting sleeve for a bearing device having at least one housing for receiving a bearing sleeve, the bearing sleeve for receiving a shaft, and the shaft is presented. The adjusting sleeve is designed to be capable of being received between the bearing sleeve and the housing and to be thermally conductive. For this purpose, an outer wall of the adjusting sleeve facing the housing has at least one outer depression, which is designed to produce an outer chamber between the adjusting sleeve and the housing in a received state of the adjusting sleeve in the bearing device, and/or an inner wall of the adjusting sleeve facing the bearing sleeve has at least one inner depression, which is designed to produce an inner chamber between the adjusting sleeve and the bearing sleeve in the received state of the adjusting sleeve in the bearing device.

By virtue of the materials involved, an adjusting sleeve presented here can conduct heat generated at the shaft during the operation of the shaft to the housing, for example, in order to prevent high temperatures, e.g. of more than 200° C., in the region of the shaft and/or the bearing sleeve.

The bearing device can be a bearing or part of a bearing for a continuous-flow machine, for example. A cavity which is formed by the outer chamber described between the adjusting sleeve and the housing and/or a cavity which is formed by the inner chamber described between the adjusting sleeve and the bearing sleeve can allow flexible arrangement of the adjusting sleeve in the bearing device. Moreover, the cavity described can also provide space for a fluid, such as a cooling fluid, e.g. a coolant.

If the individual cavities of the adjusting sleeve are connected to bores, an aerostatic or pressure-assisted aerodynamic bearing can be supplied with fluid through the adjusting sleeve. In this arrangement, the encircling cavities allow the distribution of the fluid between a multiplicity of bores in the bearing sleeve.

In order to be able to dissipate the heat, it is possible, according to one embodiment, for the outer wall of the adjusting sleeve to be shaped in the region of an edge of the outer depression so as to rest on the housing, at least partially running around and/or sealing it, in the received state of the adjusting sleeve in the bearing device, and/or for the inner wall of the adjusting sleeve to be shaped in the region of an edge of the inner depression so as to rest on the bearing sleeve, at least partially running around and/or sealing it, in the received state of the adjusting sleeve in the bearing device. The heat can be dissipated via at least one contact surface formed in this way. Leaktight reception of the fluid in the inner chamber and/or the outer chamber is furthermore possible by means of the sealing contact surface.

If the adjusting sleeve has a plurality of the outer depressions which extend around the entire outer wall and/or has a plurality of the inner depressions which extend around the entire inner wall, radially resilient reception of the adjusting sleeve between the housing and the bearing sleeve can be made possible. In this case, the adjusting sleeve can be shaped with an encircling corrugated profile, for example. Axial and/or radial forces emanating from the shaft during the operation of the shaft can thus be absorbed at least partially by the adjusting sleeve. Forces which can arise, for example, from boring of the bearing sleeve can thus also be absorbed by the adjusting sleeve.

To allow the fluid to be passed from at least one housing bore in the housing into at least one bearing sleeve bore in the bearing housing, it is possible, according to one embodiment, for at least one outer depression to be connected fluidically to the at least one inner depression by at least one opening in the adjusting sleeve. An opening of this kind can enable the cooling fluid to pass leaktightly via the housing into the bearing sleeve. It is also possible for the fluid to be passed through the opening only into the inner chamber in order to enable a cooling effect on the bearing sleeve there.

In order to restrict to the housing any force acting from the shaft in the direction of the bearing sleeve during the boring of the bearing sleeve or during the operation of the shaft, for example, it is advantageously possible for the adjusting sleeve to comprise a material that is designed to at least partially absorb the force.

To produce a frictional and/or nonpositive joint between the adjusting sleeve and the housing, it is possible, according to one embodiment, for the adjusting sleeve to be shaped to be pressed into the housing, and/or, to produce a frictional and/or nonpositive joint between the adjusting sleeve and the bearing sleeve, it is possible for the adjusting sleeve to be shaped to be pressed into the bearing sleeve.

A bearing device has at least one housing for receiving one of the adjusting sleeves described, the adjusting sleeve for receiving a bearing sleeve, the bearing sleeve for receiving a shaft, and the shaft, wherein the adjusting sleeve is arranged between the housing and the bearing sleeve. A bearing device of this kind can be used as a replacement for known bearing devices, with the difference that the bearing device presented here is advantageously designed to dissipate heat arising at the shaft to the housing.

With the aid of the adjusting sleeve, it is furthermore possible to influence the rotor-dynamic properties of the shaft. In particular, through the geometrical configuration and choice of materials of the adjusting sleeve, it is possible to influence the stiffness and damping properties thereof and thus those of the entire oscillatory system comprising the rotor, the bearing sleeve and the spring sleeve.

A method for mounting an adjusting sleeve is presented, wherein the method has at least the following steps:

supplying one of the adjusting sleeves presented; and arranging the adjusting sleeve between a bearing sleeve and a housing of a bearing device, which has at least one shaft, the bearing sleeve for receiving the shaft, the adjusting sleeve for receiving the bearing sleeve, and the housing for receiving the adjusting sleeve.

This method can be implemented, for example, in software or hardware or in a hybrid form of software and hardware, e.g. in a control device.

The approach presented here furthermore provides a control device which is designed to carry out, control or implement the steps of the method presented here in corresponding devices. By means of this variant embodiment of the approach in the form of a control device too, the object underlying the approach can be achieved quickly and efficiently.

For this purpose, the control device can have at least one processing unit for processing signals or data, at least one storage unit for storing signals or data, at least one interface with a sensor or an actuator for reading in sensor signals from the sensor or for outputting control signals to the actuator and/or at least one communications interface for reading in or outputting data, which are embedded in a communications protocol. The processing unit can be a signal processor, a microcontroller or the like, for example, wherein the storage unit can be a flash memory, an EPROM or a magnetic storage unit. The communications interface can be designed to read in or output data wirelessly and/or via wires, wherein a communications interface which can read in or output data via wires can read in these data from a corresponding data transmission line or output them to a corresponding data transmission line electrically or optically, for example.

In the present case, a control device can be understood to mean an electric device which processes sensor signals and, in accordance therewith, outputs control and/or data signals. The control device can have an interface, which can take the form of hardware and/or software. In hardware form, the interfaces can be part of what is referred to as a system ASIC, for example, which comprises a very wide variety of functions of the control device. However, it is also possible for the interfaces to be dedicated integrated circuits or to consist at least partially of discrete components. In software form, the interfaces can be software modules, which are available on a microcontroller in addition to other software modules, for example.

In an advantageous embodiment, the control device performs control of a mounting device for mounting an adjusting sleeve between a housing and a bearing sleeve of a bearing device. For this purpose, the control device can access sensor signals, such as a supply signal and an arrangement signal, for example. Control is exercised via actuators, such as a supply device and an arrangement device.

Also advantageous is a computer program product or computer program comprising program code, which can be stored on a machine-readable carrier or storage medium, such as a semiconductor memory, a hard drive or an optical storage device and is used to carry out, implement and/or control the steps of the method according to one of the embodiments described above, especially if the program product or program is executed on a computer or an apparatus.

DETAILED DESCRIPTION

Illustrative embodiments of the approach presented here are illustrated in the drawings and explained in greater detail in the following description. In the drawings.

DETAILED DESCRIPTION

In the following description of advantageous illustrative embodiments of the present approach, identical or similar reference signs are used for those elements which are illustrated in the various figures and act in a similar way, while repeated description of these elements is avoided.

Figure 1:
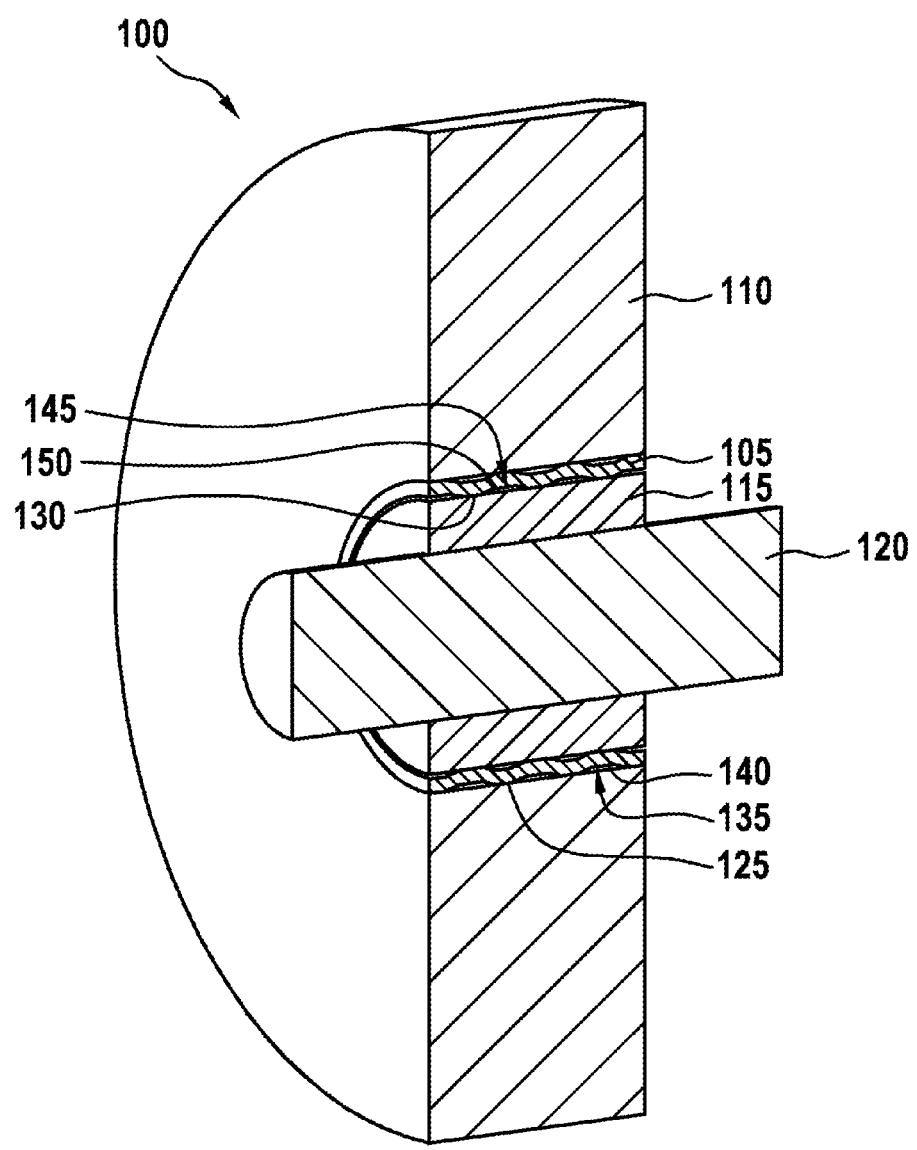
FIG. 1 shows a perspective cross section of a bearing device having an adjusting sleeve according to one illustrative embodiment.

FIG. 1 shows a perspective cross section of a bearing device 100 having an adjusting sleeve 105 according to one illustrative embodiment.

The bearing device 100 has a housing 110, the adjusting sleeve 105, a bearing sleeve 115 and a shaft 120. The shaft 120 is arranged in a center of the bearing device 100 and received by the bearing sleeve 115. The bearing sleeve 115, in turn, is received by the adjusting sleeve 105, which is designed to be thermally conductive. The housing 110 receives the adjusting sleeve 105.

The adjusting sleeve 105 has an outer wall 125, which faces the housing 110, and an inner wall 130, which faces the bearing sleeve 115. The outer wall 125 has at least one outer depression 135, which produces an outer chamber 140 between the adjusting sleeve 105 and the housing 110 in the received state of the adjusting sleeve 105 in the bearing device 100. According to this illustrative embodiment, the inner wall 130 of the adjusting sleeve 105 has at least one inner depression 145, which produces an inner chamber 150 between the adjusting sleeve 105 and the bearing sleeve 115 in the received state of the adjusting sleeve 105 in the bearing device 100.

In bearing devices without the adjusting sleeve 105 presented here, in which the bearing sleeve 115 is firmly clamped in the housing 110, the bearing sleeve 115 cannot expand freely in accordance with its temperature. This hindrance to expansion then, in turn, has effects on a functionally relevant bearing gap between the bearing sleeve 115 and the shaft 120, which is generally only a few micrometers. The different expansions of the bearing sleeve 115 and the housing 110 can be caused by different temperatures or materials with different thermal expansion coefficients. In contrast to O-rings, for example, which are often used as adjusting and damping elements, the adjusting sleeve 105 presented here is advantageously thermally conductive. In this way, it is possible to prevent the bearing sleeve 115 and the shaft 120 being subjected to excessively high thermal stresses. Moreover, the adjusting sleeve 105 presented here can be used at high temperatures of, for example, over 200° C., and a service life of several years for the adjusting sleeve 105 can be achieved. Unlike the situation with other bearing devices, an aging-related change in the position of the bearing sleeve 115 in the housing 110 is also prevented here by the adjusting sleeve 105, for example.

Figure 2:
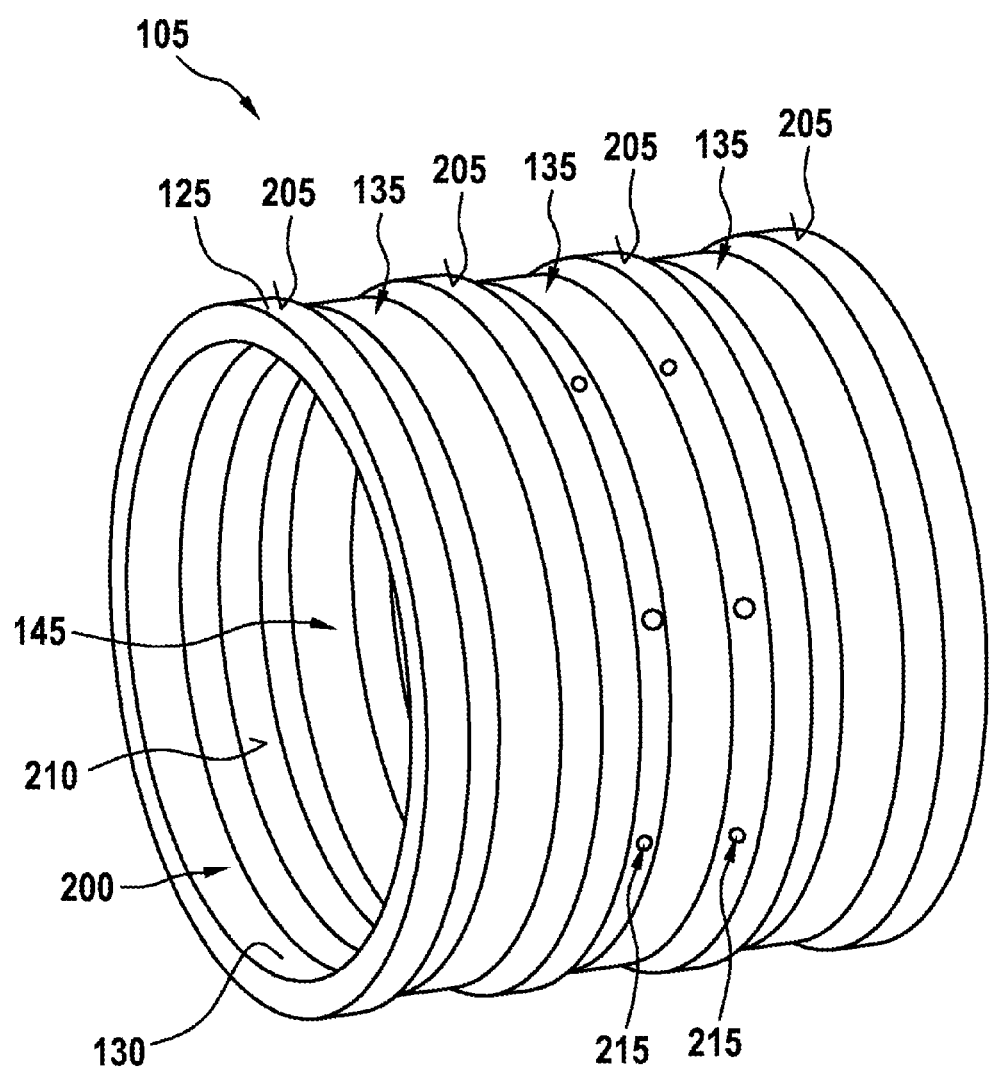
FIG. 2 shows a perspective side view of an adjusting sleeve according to one illustrative embodiment.

FIG. 2 shows a perspective side view of an adjusting sleeve 105 according to one illustrative embodiment. This can be the adjusting sleeve 105 described with reference to FIG. 1.

In a center of the adjusting sleeve 105, the adjusting sleeve 105 according to this illustrative embodiment has a through opening 200. According to this illustrative embodiment, the outer wall 125 has three encircling outer depressions 135, and the inner wall 130 has two encircling inner depressions 145, which are fully visible in FIG. 3. The outer depressions 135 and the inner depressions 145 are designed to allow radially resilient reception of the adjusting sleeve 105 between the housing 110 and the bearing sleeve 115.

According to this illustrative embodiment, four outer contact surfaces 205, which are arranged in the region of edges of the outer depressions 135, are designed to rest in a sealing manner on the housing 110 when the adjusting sleeve 105 is received in the housing 110. According to this illustrative embodiment, three inner contact surfaces 210, which are fully visible in FIG. 3 and which are arranged in the region of edges of the inner depressions 145, are designed to rest in a sealing manner on the bearing sleeve 115 when the bearing sleeve 115 is received in the adjusting sleeve 105. As an option, the central one of the three outer depressions 135 according to this illustrative embodiment has a plurality of openings 215, which fluidically connect the outer depression 135 either to one of the two inner depressions 145 or to the other of the two inner depressions 145.

Figure 3:
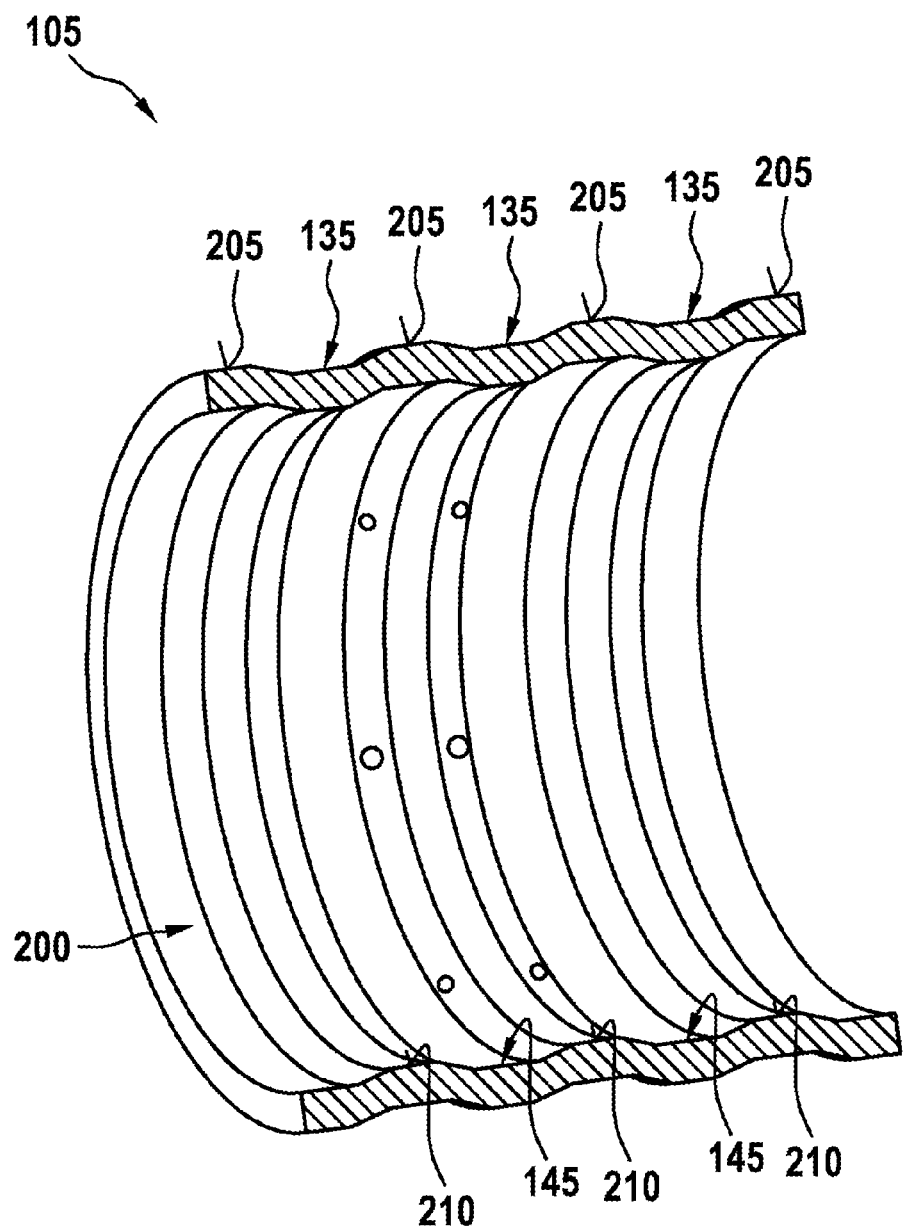
FIG. 3 shows a perspective cross section of an adjusting sleeve according to one illustrative embodiment.

FIG. 3 shows a perspective cross section of an adjusting sleeve 105 according to one illustrative embodiment. This can be the adjusting sleeve 105 described with reference to FIG. 2. As shown in FIG. 3, the adjusting sleeve (105) shown in FIG. 3 has at least one outer depression (135) and at least one inner depression (145) extending along the central axis of the adjusting sleeve (105) to radially overlap, and the at least one outer depression (135) and the at least one inner depression (145) are substantially uniform in cross-sectional shape. As further shown in FIG. 3, the adjusting sleeve (105) has a substantially constant radial thickness along the central axis of the adjusting sleeve (105), and a cross-section of the adjusting sleeve (105) has a substantially wave-like configuration.

Figure 4:
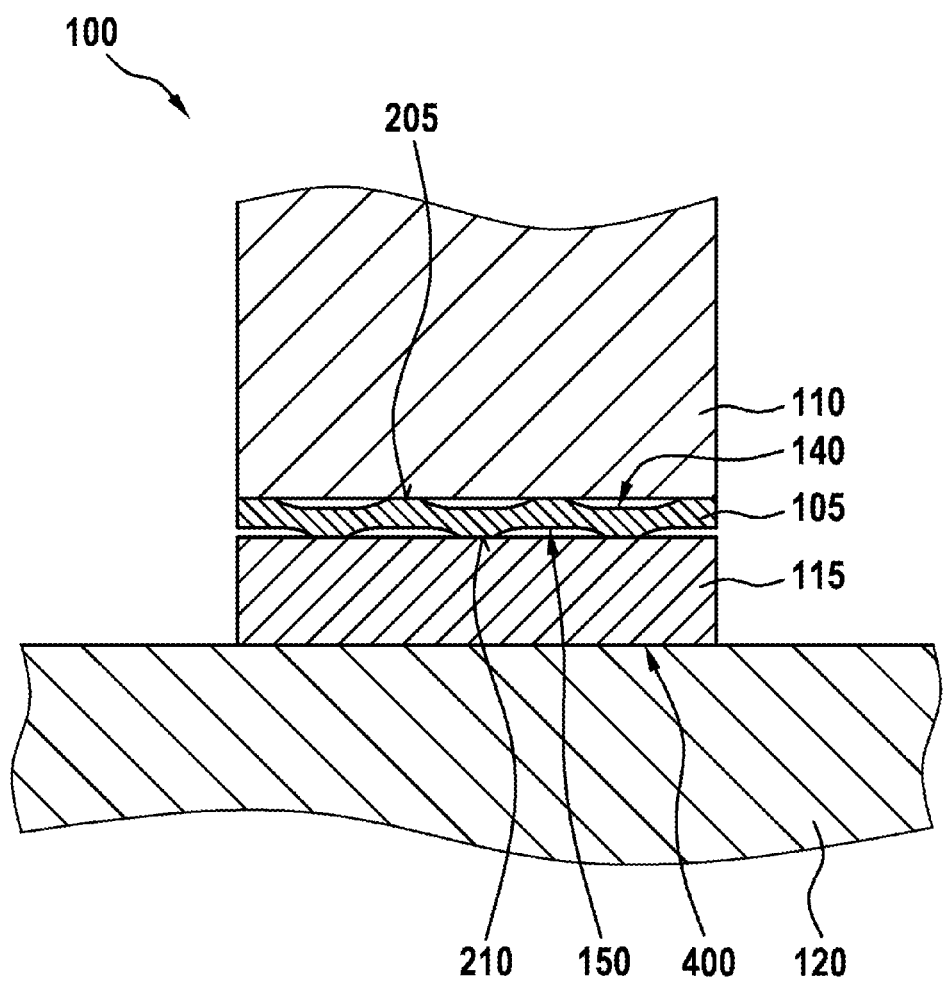
FIG. 4 shows a lateral cross section of a bearing device according to one illustrative embodiment.

FIG. 4 shows a lateral cross section of a bearing device 100 according to one illustrative embodiment. This can be the bearing device 100 described with reference to FIG. 1 with one of the adjusting sleeves 105 described in FIGS. 2 and 3.

In other words, a shaft-bearing system comprising a bearing sleeve 115 and an adjusting sleeve 105 is illustrated in FIG. 4. In the illustrative embodiment, the adjusting sleeve 105 has been pressed into the housing 110. The bearing sleeve 115 has then been pressed into the adjusting sleeve 105. By virtue of the press fits, the bearing sleeve 105 is connected frictionally and thus in a manner secure against rotation to the housing 110.

This approach describes an adjusting sleeve 105 which is installed between the bearing sleeve 115 and the housing 110. Here, the adjusting sleeve 105 has the task of compensating for thermal expansions of the bearing sleeve 115 and the housing 110. It is furthermore possible, by means of the adjusting sleeve 105, to set the thermal resistance between the bearing sleeve 115 and the housing 110. It is thereby possible to dissipate heat arising in the bearing gap 400 between the shaft 120 and the bearing sleeve 115 selectively into the housing 110 via the adjusting sleeve 105. In this arrangement, the bearing gap 400 can be a fluid film, for example. Given a sufficiently rigid design of the adjusting sleeve 105, it is furthermore possible to absorb forces which can arise during the production of an inner bore of the bearing sleeve 115. In particular, radial machining forces do not lead to deflection of the bearing sleeve 115. Consequently, the inner bore of the bearing sleeve 115 can be produced with greater accuracy. The adjusting sleeve 105 forms various chambers in the form of the outer chambers 140 and inner chambers 150, which can be used selectively with pressure assistance in aerostatic or aerodynamic bearing devices 100, which can also be referred to as bearings. Thus, for example, a fluid can be distributed from a central housing bore of the housing 110 between a plurality of bores in the bearing sleeve 115. By means of the contact surfaces in the form of the outer contact surfaces 205 and the inner contact surfaces 210 of the adjusting sleeve 105 with the housing 110 and the bearing sleeve 115, the chambers 140, 150 are simultaneously sealed off, thereby making it possible to dispense with additional sealing elements, such as O-rings. In the case of aerostatic and aerodynamic bearings, the chambers 140, 150 can furthermore be used as cooling ducts in order to control the temperature of the bearing sleeve 115.

Figure 5:
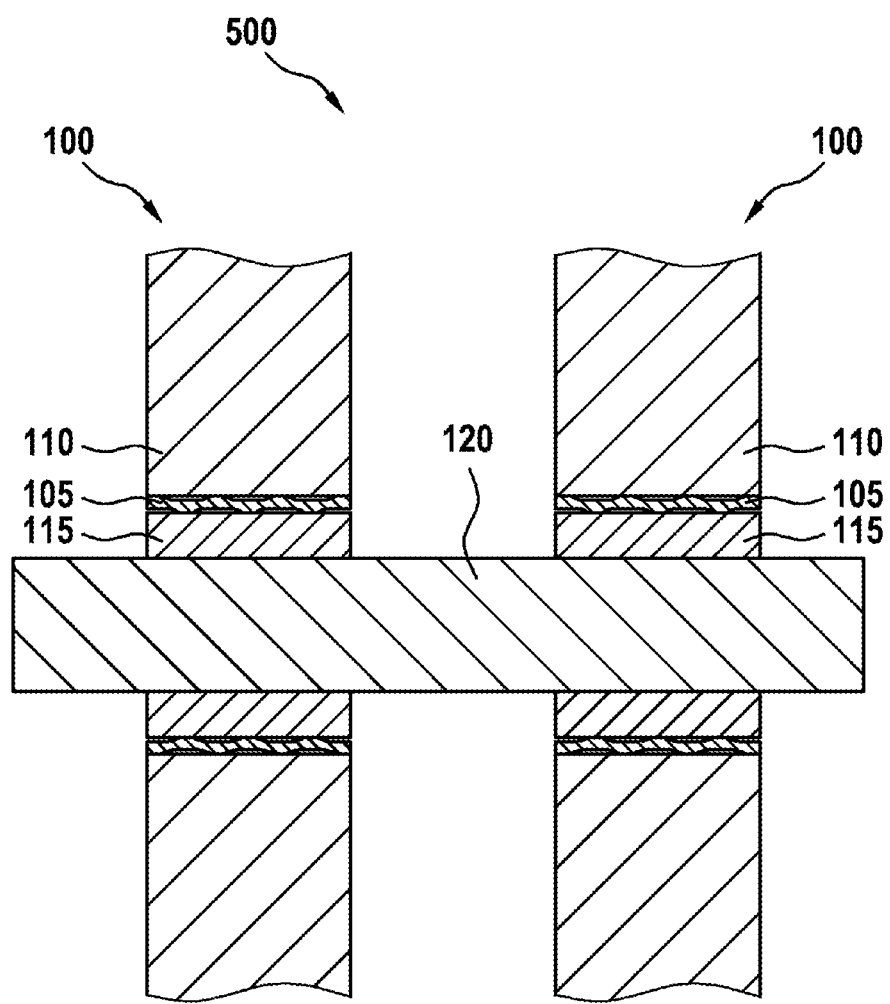
FIG. 5 shows a lateral cross section of a bearing according to one illustrative embodiment.

FIG. 5 shows a lateral cross section of a bearing 500 according to one illustrative embodiment. This can comprise two of the bearing devices 100 described with reference to FIG. 4 with just one shaft 120.

The shaft-bearing system shown here comprises two radial bearings in the form of the bearing devices 100. When used, for example, in the region of a continuous-flow machine, the shaft 120 is received in at least two radial bearings, as illustrated.

Figure 6:
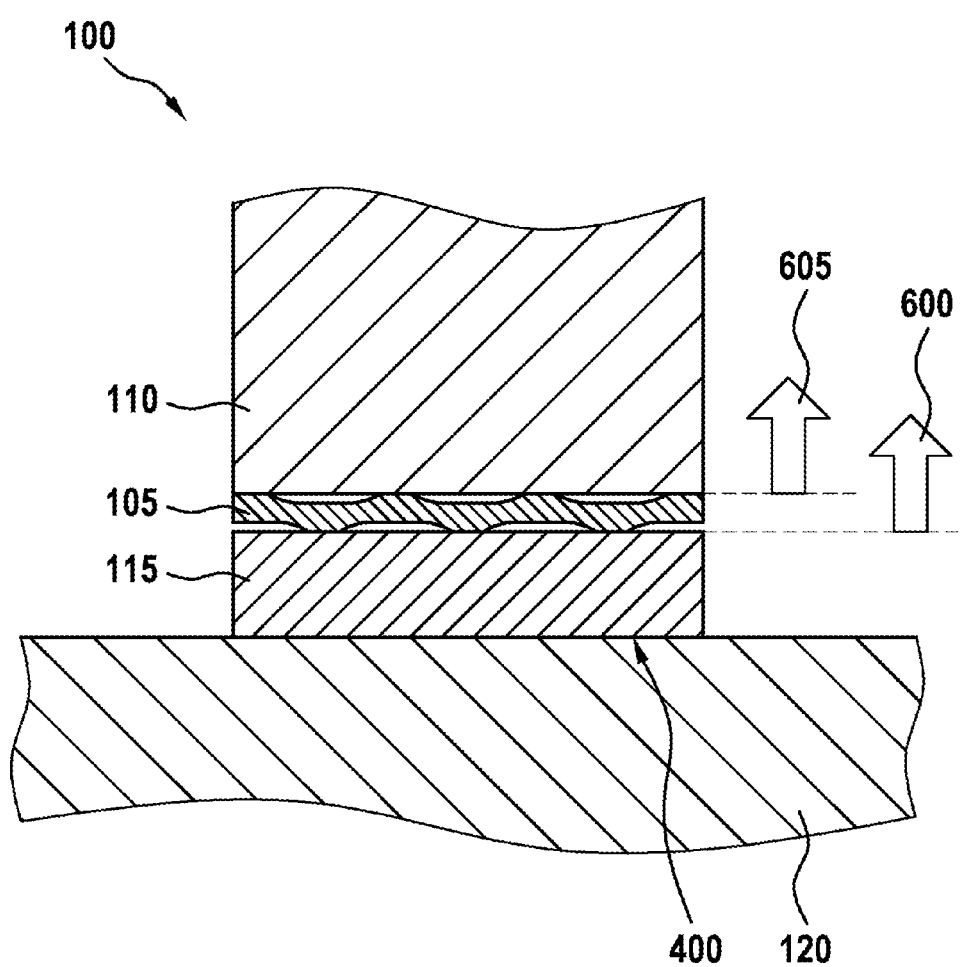
FIG. 6 shows a lateral cross section of a bearing device according to one illustrative embodiment.

FIG. 6 shows a lateral cross section of a bearing device 100 according to one illustrative embodiment. This can be the bearing device 100 described with reference to FIG. 4.

Compensation of thermal expansions is shown. Owing to fluid friction in the bearing gap 400, the arrangement heats up, wherein the individual components of the bearing device 100 can assume different temperatures. Moreover, the components can be composed of materials with different thermal expansion coefficients. The different temperatures and/or materials lead to a radial displacement 600 of the bearing sleeve 115 (×2) which can differ from a radial displacement 605 of the housing 110 (×1). Owing to the undulating configuration of the adjusting sleeve 105, it has spring properties in the radial direction. This has the following advantages: the different displacements 600, 605 are compensated, the bearing sleeve 115 is positioned in a fixed manner in the housing 110 by virtue of the press fits, the bearing sleeve 115 can expand owing to its temperature and is hardly influenced at all by the rigid housing 110. Consequently, the bearing gap 400 between the bearing sleeve 115 and the shaft 120 remains approximately constant if these two components have the same temperature and are composed of the same material.

Figure 7:
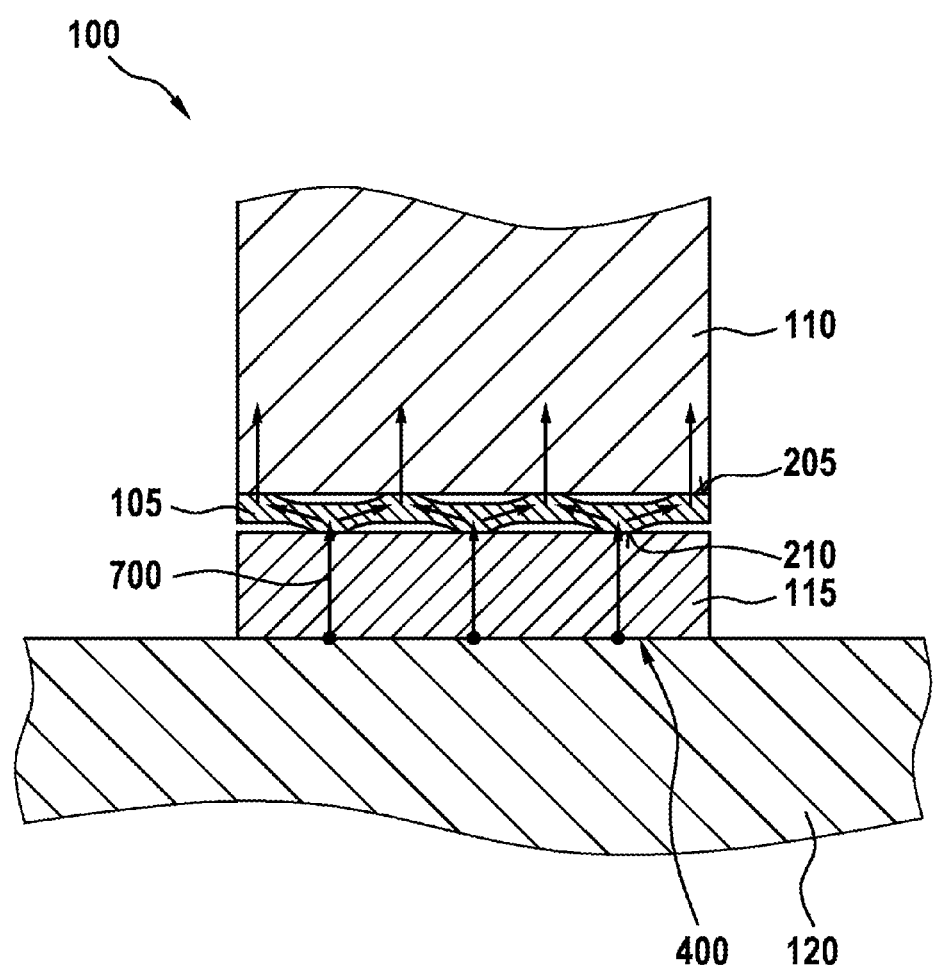
FIG. 7 shows a lateral cross section of a bearing device according to one illustrative embodiment.

FIG. 7 shows a lateral cross section of a bearing device 100 according to one illustrative embodiment. This can be one of the bearing devices 100 described with reference to FIGS. 4 and 6.

The arrows 700 show heat flows of heat arising in the bearing gap 400. Owing to the outer contact surfaces 205 and the inner contact surfaces 210 and the thermal conductivity of the adjusting sleeve 105, the heat arising in the bearing gap 400 can be dissipated. This has the following advantages: the temperatures of the bearing sleeve 115 and the shaft 120 are reduced and the housing 110 is heated and expands. As a result, the bearing sleeve 115 is hindered to a lesser extent in its thermal expansion. Consequently, the adjusting sleeve 105 has only to compensate for a small difference in the thermal expansions of the bearing sleeve 115 and the housing 110. The thermal behavior of the overall component in the form of the bearing device 100 can be significantly affected by the thermal resistance of the adjusting sleeve 105. Among the factors by means of which the thermal resistance can be selectively influenced are a material used for the adjusting sleeve 105, a wall thickness of the adjusting sleeve 105 and/or a number and size of the contact surfaces 205, 210.

Figure 8:
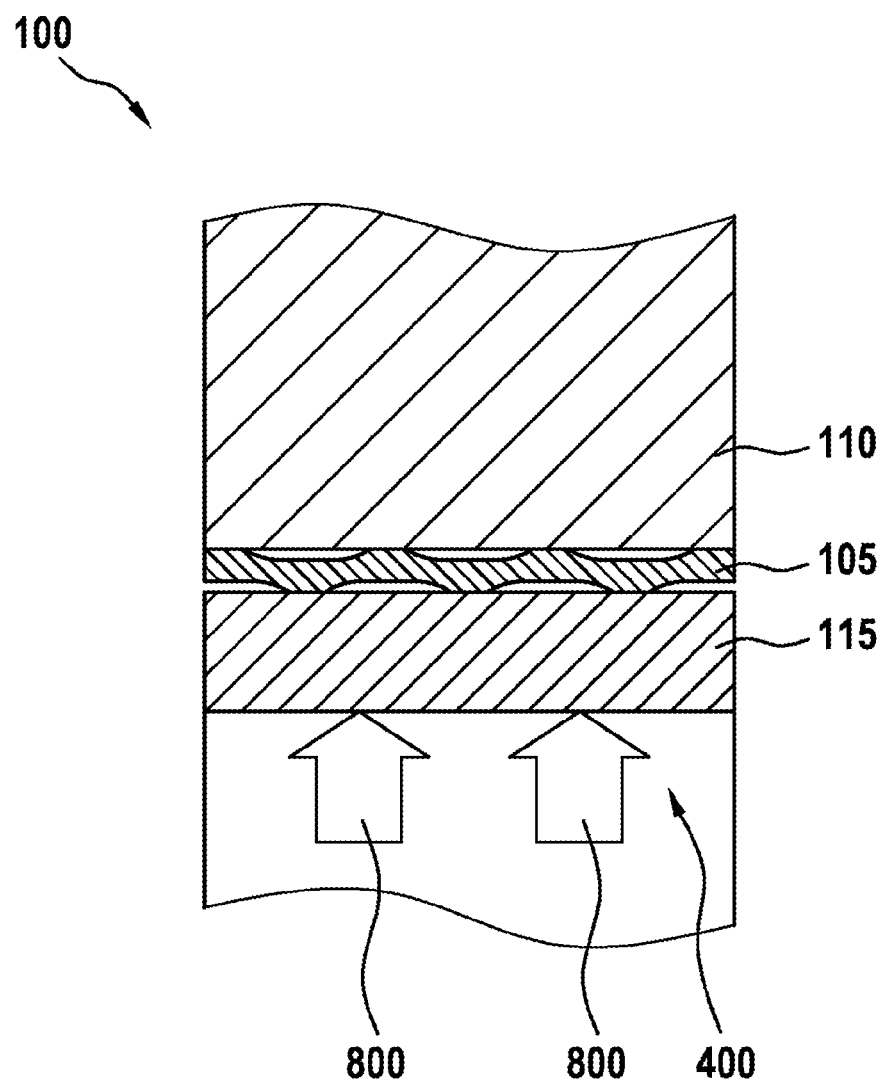
FIG. 8 shows a lateral cross section of a bearing device according to one illustrative embodiment.

FIG. 8 shows a lateral cross section of a bearing device 100 according to one illustrative embodiment. This can be the bearing device 100 described with reference to FIG. 7. The shaft belonging to the bearing device 100 is not shown.

The figure shows the radial machining forces 800 acting here, which arise during production of inner bores. Given a sufficiently rigid design of the adjusting sleeve 105, it is possible to absorb forces which arise during the production of the inner bore owing, for example, to boring, turning and/or grinding etc. of the bearing sleeve 115. In particular, the radial machining forces 800 do not lead to deflection of the bearing sleeve 115. Consequently, the inner bore of the bearing sleeve 115 can be produced with a very high accuracy.

Figure 9:
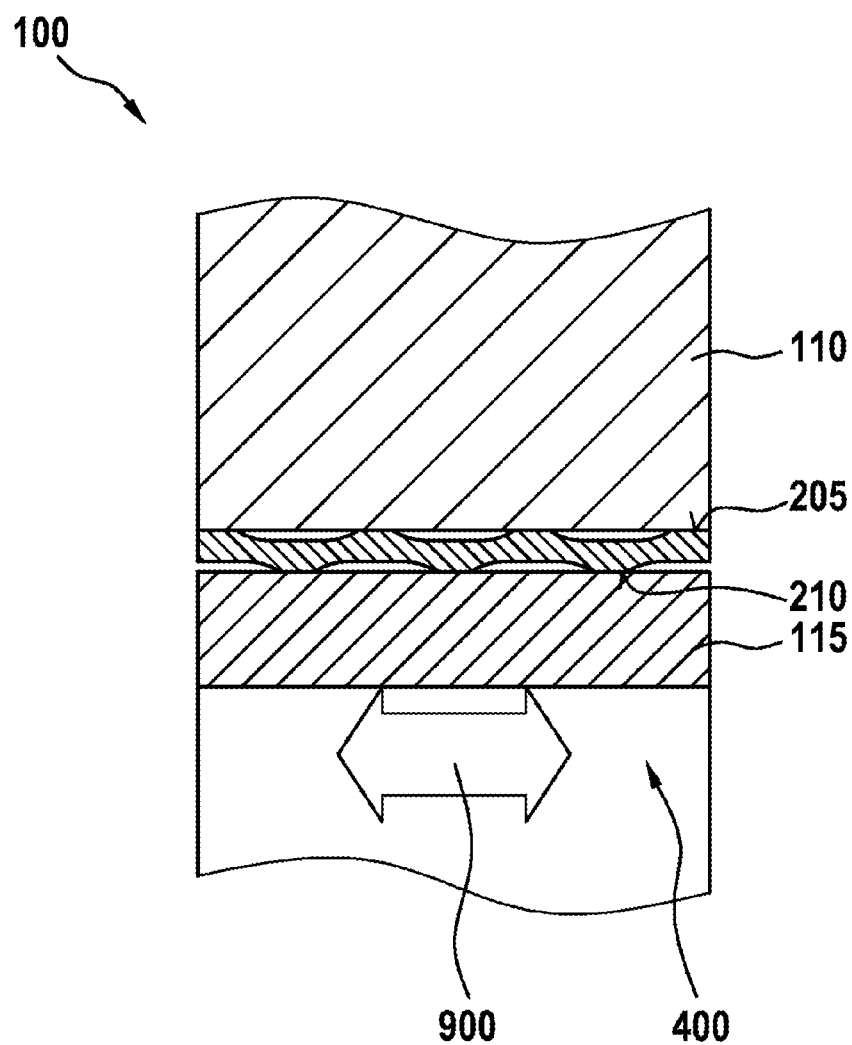
FIG. 9 shows a lateral cross section of a bearing device according to one illustrative embodiment.

FIG. 9 shows a lateral cross section of a bearing device 100 according to one illustrative embodiment. This can be the bearing device 100 described with reference to FIG. 8. The shaft belonging to the bearing device 100 is not shown.

Axial machining forces 900 which likewise arise during the production of inner bores are absorbed via friction at the contact surfaces 205, 210 of the adjusting sleeve 115.

Figure 10:
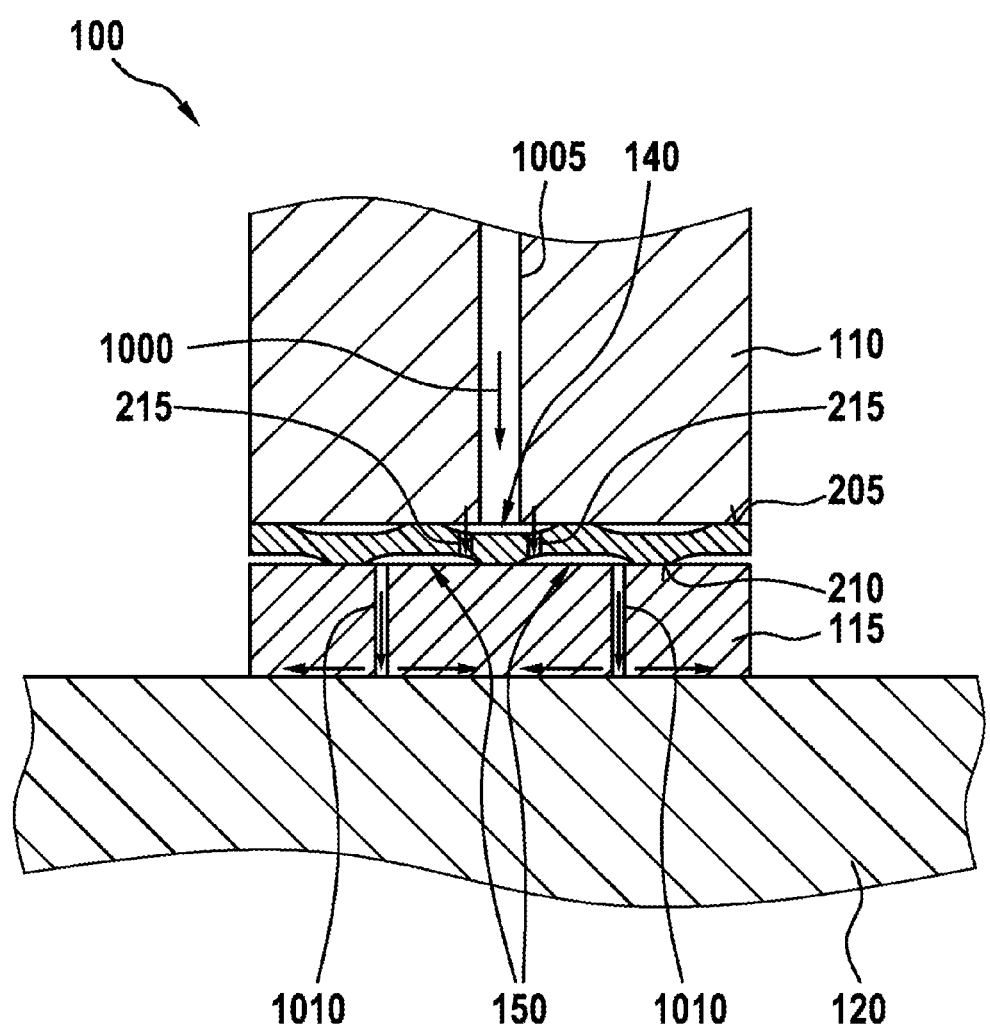
FIG. 10 shows a lateral cross section of a bearing device according to one illustrative embodiment.

FIG. 10 shows a lateral cross section of a bearing device 100 according to one illustrative embodiment. This can be one of the bearing devices 100 described with reference to the above figures.

Arrows in the bearing device 100 show a supply of a fluid 1000 in a bearing device 100 with pressure assistance, the bearing device being aerostatic or aerodynamic according to this illustrative embodiment. In the aerostatic or aerodynamic bearing device 100 with pressure assistance, the adjusting sleeve 105 forms various chambers in the form of the outer chambers 140 and the inner chambers 150. Thus, the fluid 1000 can be distributed from a central housing bore 1005 of the housing 110 between a plurality of bearing sleeve bores 1010 in the bearing sleeve 115 via the openings 215. By means of the contact surfaces 205, 210 of the adjusting sleeve 105 with the housing 110 and the bearing sleeve 115, the chambers 140, 150 are simultaneously sealed off, thereby making it possible to dispense with additional sealing elements, such as O-rings.

Figure 11:
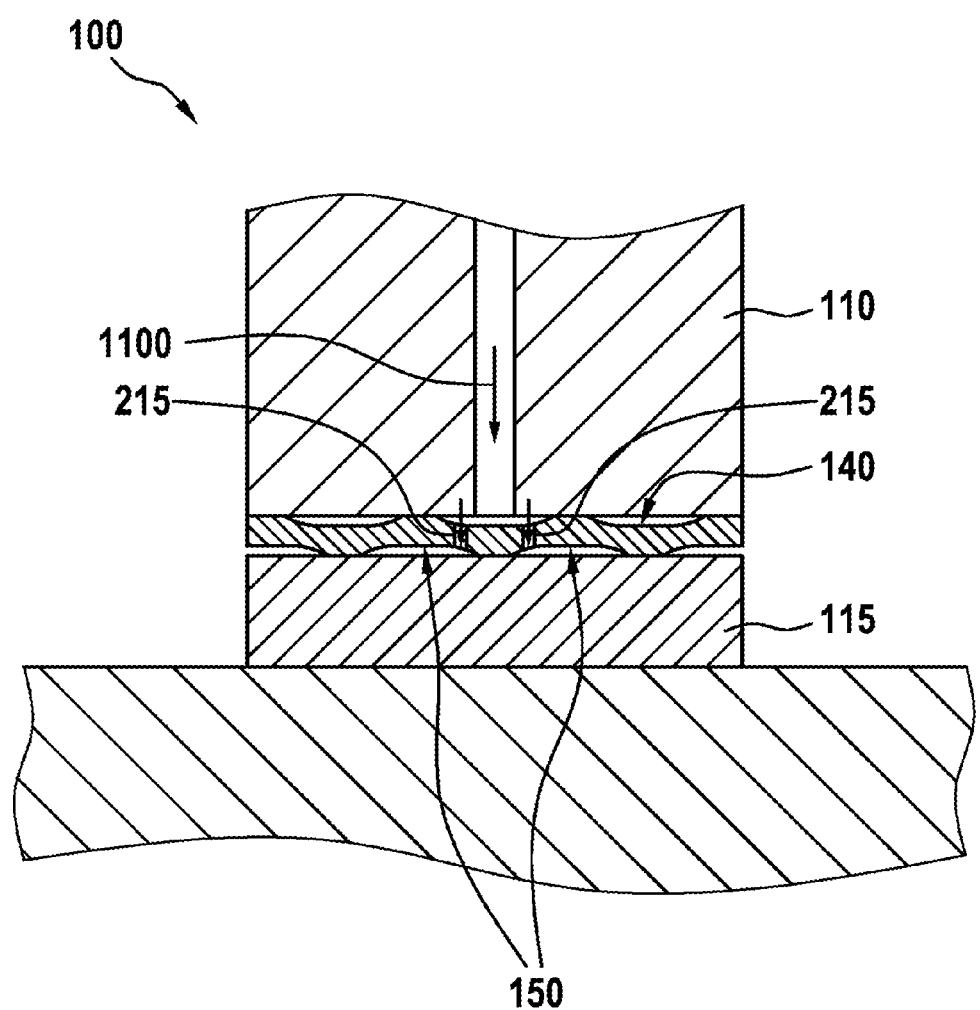
FIG. 11 shows a lateral cross section of a bearing device according to one illustrative embodiment.

FIG. 11 shows a lateral cross section of a bearing device 100 according to one illustrative embodiment. This can be one of the bearing devices 100 described with reference to the above figures.

According to this illustrative embodiment, arrows in the bearing device 100 denote cooling flows 1100 through the bearing device 100. In the case of aerostatic and aerodynamic bearing devices 100, the chambers 140, 150 can furthermore be used as cooling ducts in order to control the temperature of the bearing sleeve 115.

Figure 12:
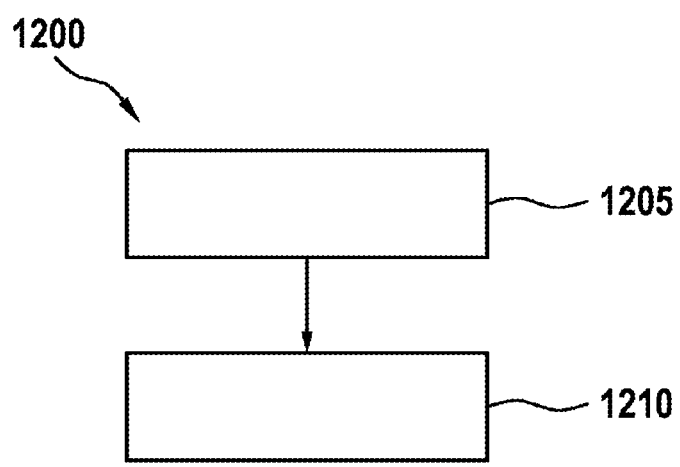
FIG. 12 shows a flow diagram of a method for mounting an adjusting sleeve according to one illustrative embodiment.

FIG. 12 shows a flow diagram of a method 1200 for mounting an adjusting sleeve according to one illustrative embodiment. This can be a method 1200 for mounting one of the adjusting sleeves described in the preceding figures. In a supply step 1205, one of the adjusting sleeves presented is made available. In an arrangement step 1210, the adjusting sleeve is arranged between a bearing sleeve and a housing of a bearing device, which has at least one shaft, the bearing sleeve for receiving the shaft, the adjusting sleeve for receiving the bearing sleeve, and the housing for receiving the adjusting sleeve.

If an illustrative embodiment includes an "and/or" conjunction between a first feature and a second feature, this should be interpreted to mean that the illustrative embodiment has both the first feature and the second feature according to one embodiment and either only the first feature or only the second feature according to another embodiment.

What is claimed is:

1. An adjusting sleeve (105) for a bearing device (100), the bearing device (100) having a housing (110), a bearing sleeve (115), and a shaft (120), wherein the housing (110) receives the bearing sleeve (115), wherein the bearing sleeve (115) receives the shaft (120), and (120), wherein the adjusting sleeve (105) is configured to be received between the bearing sleeve (115) and the housing (110) and to be thermally conductive, the adjusting sleeve comprising:

an outer wall (125) having at least one outer depression (135), which is configured to produce an outer chamber (140) between the adjusting sleeve (105) and the housing (110) in a received state of the adjusting sleeve (105) in the bearing device (100), and an inner wall (130) having at least one inner depression (145), which is configured to produce an inner chamber (150) between the adjusting sleeve (105) and the bearing sleeve (115) in the received state of the adjusting sleeve (105) in the bearing device (100), wherein the at least one outer depression (135) is connected fluidically to the at least one inner depression (145) by at least one opening (215) in the adjusting sleeve (105), the opening (215) extending in a direction substantially radially away from a central axis of the adjusting sleeve (105), wherein the outer wall (125) of the adjusting sleeve (105) is shaped so as to rest on the housing (110), at least partially running around and/or sealing against the housing, in the received state of the adjusting sleeve (105) in the bearing device (100), and wherein the inner wall (130) of the adjusting sleeve (105) is shaped so as to rest on the bearing sleeve (115), at least partially running around and/or sealing against the bearing sleeve, in the received state of the adjusting sleeve (105) in the bearing device (100).

2. The adjusting sleeve (105) as claimed in claim 1, having a plurality of outer depressions (135) including the at least one outer depression (135), which extend around the entire outer wall (125) and/or a plurality of inner depressions (145) including the at least one inner depression (145), which extend around the entire inner wall (130), in order to allow radially resilient reception of the adjusting sleeve (105) between the housing (110) and the bearing sleeve (115).

3. The adjusting sleeve (105) as claimed in claim 1, which comprises a material that is configured to at least partially absorb a force (800, 900) acting on the bearing sleeve (115).

4. The adjusting sleeve (105) as claimed in claim 1, wherein the adjusting sleeve (105) is shaped to be pressed into the housing (110) in order to produce a frictional and/or nonpositive joint between the adjusting sleeve (105) and the housing (110), and/or to be pressed onto the bearing sleeve (115) in order to produce a frictional and/or nonpositive joint between the adjusting sleeve (105) and the bearing sleeve (115).

5. The adjusting sleeve (105) as claimed in claim 1, wherein the at least one outer depression (135) and the at least one inner depression (145) extend along the central axis of the adjusting sleeve (105) to radially overlap.

6. The adjusting sleeve (105) as claimed in claim 1, wherein the at least one outer depression (135) and the at least one inner depression (145) are substantially uniform in cross-sectional shape.

7. The adjusting sleeve (105) as claimed in claim 1, wherein the adjusting sleeve (105) has a substantially constant radial thickness along the central axis of the adjusting sleeve (105).

8. The adjusting sleeve (105) as claimed in claim 1, wherein a cross-section of the adjusting sleeve (105) has a wave-like configuration.

9. A method (1200) for mounting an adjusting sleeve (105), wherein the method (1200) has at least the following steps:
supplying (1205) the adjusting sleeve (105) as claimed in claim 1; and
arranging (1210) the adjusting sleeve (105) between the bearing sleeve (115) and the housing (110) of the bearing device (100), the bearing device having the shaft (120), the bearing sleeve (115) receiving the shaft (120), the adjusting sleeve (105) receiving the bearing sleeve (115), and the housing (110) receiving the adjusting sleeve (105).

10. A bearing device (100) comprising an adjusting sleeve (105), a housing (110), a bearing sleeve (115), and a shaft (120),
wherein the housing (110) receives the bearing sleeve (115),
wherein the bearing sleeve (115) receives the shaft (120),
wherein the adjusting sleeve (105) is configured to be received between the bearing sleeve (115) and the housing (110) and to be thermally conductive,
wherein an outer wall (125) of the adjusting sleeve (105) has at least one outer depression (135), which is configured to produce an outer chamber (140) between the adjusting sleeve (105) and the housing (110) in a received state of the adjusting sleeve (105) in the bearing device (100),
wherein an inner wall (130) of the adjusting sleeve (105) has at least one inner depression (145), which is configured to produce an inner chamber (150) between the adjusting sleeve (105) and the bearing sleeve (115) in the received state of the adjusting sleeve (105) in the bearing device (100),
wherein at least the at least one outer depression (135) is connected fluidically to the at least one inner depression (145) by at least one opening (215) in the adjusting sleeve (105), the opening (215) extending in a direction substantially radially away from a central axis of the adjusting sleeve (105), and
wherein the outer wall (125) of the adjusting sleeve (105) is shaped so as to rest on the housing (110), at least partially running around and/or sealing the housing, in the received state of the adjusting sleeve (105) in the bearing device (100), and in which the inner wall (130) of the adjusting sleeve (105) is shaped so as to rest on the bearing sleeve (115), at least partially running around and/or sealing the housing, in the received state of the adjusting sleeve (105) in the bearing device (100).

11. The bearing device (100) as claimed in claim 10, wherein the adjusting sleeve (105) has a plurality of outer depressions (135) including the at least one outer depression (135), which extend around the entire outer wall (125) and/or a plurality of inner depressions (145) including the at least one inner depression (145), which extend around the entire inner wall (130), in order to allow radially resilient reception of the adjusting sleeve (105) between the housing (110) and the bearing sleeve (115).

12. The bearing device (100) as claimed in claim 10, wherein the adjusting sleeve (105) comprises a material that is configured to at least partially absorb a force (800, 900) acting on the bearing sleeve (115).

13. The bearing device (100) as claimed in claim 10, wherein the adjusting sleeve (105) is shaped to be pressed into the housing (110) in order to produce a frictional and/or nonpositive joint between the adjusting sleeve (105) and the housing (110), and/or to be pressed onto the bearing sleeve (115) in order to produce a frictional and/or nonpositive joint between the adjusting sleeve (105) and the bearing sleeve (115).

14. The bearing device (100) as claimed in claim 10, wherein the at least one outer depression (135) and the at least one inner depression (145) extend along the central axis of the adjusting sleeve (105) to radially overlap.

15. The bearing device (100) as claimed in claim 10, wherein the at least one outer depression (135) and the at least one inner depression (145) are substantially uniform in cross-sectional shape.

16. The bearing device (100) as claimed in claim 10, wherein the adjusting sleeve (105) has a substantially constant radial thickness along the central axis of the adjusting sleeve (105).

17. The bearing device (100) as claimed in claim 10, wherein a cross section of the adjusting sleeve (105) has a wave-like configuration.

18. An adjusting sleeve (105) for a bearing device (100), the bearing device (100) having a housing (110), a bearing sleeve (115), and a shaft (120), wherein the housing (110) receives the bearing sleeve (115), wherein the bearing sleeve (115) receives the shaft (120), and wherein the adjusting sleeve (105) is configured to be received between the bearing sleeve (115) and the housing (110) and to be thermally conductive,
the adjusting sleeve comprising:
an outer wall (125) having at least one outer depression (135), which is configured to produce an outer chamber (140) between the adjusting sleeve (105) and the housing (110) in a received state of the adjusting sleeve (105) in the bearing device (100), and an inner wall (130) having at least one inner depression (145), which is configured to produce an inner chamber (150) between the adjusting sleeve (105) and the bearing sleeve (115) in the received state of the adjusting sleeve (105) in the bearing device (100), wherein the at least one outer depression (135) is connected fluidically to the at least one inner depression (145) by at least one opening (215) in the adjusting sleeve (105), wherein the outer wall (125) of the adjusting sleeve (105) is shaped so as to rest on the housing (110), at least partially running around and/or sealing against the housing, in the received state of the adjusting sleeve (105) in the bearing device (100), wherein the inner wall (130) of the adjusting sleeve (105) is shaped so as to rest on the bearing sleeve (115), at least partially running around and/or sealing against the bearing sleeve, in the received state of the adjusting sleeve (105) in the bearing device (100), and wherein the at least one outer depression (135) and the at least one inner depression (145) are substantially uniform in cross-sectional shape.

* * * * *